United States Patent
Chen et al.

(10) Patent No.: US 10,583,709 B2
(45) Date of Patent: Mar. 10, 2020

(54) FACILITATING PERSONALIZED VEHICLE OCCUPANT COMFORT

(71) Applicant: International Business Machines Corporation, Armonk, NY (US)

(72) Inventors: Hao Chen, Beijing (CN); Shao Chun Li, Beijing (CN); Qi Cheng Li, Beijing (CN); Jie Ma, Nanjing (CN); Li Jun Mei, Beijing (CN); Jian Wang, Beijing (CN); Xin Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 15/349,393

(22) Filed: Nov. 11, 2016

(65) Prior Publication Data
US 2018/0134116 A1 May 17, 2018

(51) Int. Cl.
*B60H 1/00* (2006.01)
*B60N 2/56* (2006.01)
*B60N 2/90* (2018.01)

(52) U.S. Cl.
CPC ..... *B60H 1/00742* (2013.01); *B60H 1/00764* (2013.01); *B60N 2/56* (2013.01); *B60N 2/919* (2018.02); *B60N 2/976* (2018.02)

(58) Field of Classification Search
CPC ............ B60H 1/00735; B60H 1/00742; B60H 1/00642; B60H 1/0073; B60H 1/00733; B60H 2001/00733
See application file for complete search history.

(56) References Cited

U.S. PATENT DOCUMENTS

| | | | |
|---|---|---|---|
| 2005/0278093 A1* | 12/2005 | Kameyama | B60R 16/0373 701/36 |
| 2008/0297336 A1 | 12/2008 | Lee | |
| 2012/0170817 A1* | 7/2012 | Yang | G06K 9/00288 382/118 |
| 2014/0309935 A1* | 10/2014 | Ricci | H04W 4/21 701/540 |
| 2015/0025738 A1* | 1/2015 | Tumas | B60H 1/00742 701/36 |
| 2016/0089954 A1* | 3/2016 | Rojas Villanueva | G01C 21/3484 701/36 |
| 2018/0072133 A1* | 3/2018 | Yamanaka | B60H 1/00742 |

FOREIGN PATENT DOCUMENTS

| | | | | |
|---|---|---|---|---|
| WO | 2014014862 | | 1/2014 | |
| WO | 2014085302 | | 6/2014 | |
| WO | WO-2016166938 A1 | * | 10/2016 | ......... B60H 1/00742 |

* cited by examiner

*Primary Examiner* — Eric S Ruppert
(74) *Attorney, Agent, or Firm* — Amin, Turocy & Watson, LLP

(57) ABSTRACT

A vehicle occupant comfort system, comprises a processor that stores computer executable components stored in memory. A plurality of sensors sense ambient conditions associated with exterior and interior conditions of a vehicle. A context component infers or determines context of an occupant of the vehicle. A comfort model component implicitly and explicitly trained on occupant comfort related data analyzes information from the plurality of sensors and context component. A comfort controller adjusts environmental conditions of a passenger compartment of the vehicle based at least in part on output of the comfort model component.

20 Claims, 14 Drawing Sheets

FACILITATING PERSONALIZED VEHICLE OCCUPANT COMFORT

BACKGROUND

The subject disclosure relates generally to machine learning systems and in particular to utilizing machine learning systems to regulate environmental conditions within a vehicle to improve occupant comfort.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate performing root cause analysis in dynamic software testing via probabilistic modeling are described.

According to an embodiment, a system, comprises: a memory storing one or more computer readable and executable components; and a processor operably coupled to the memory and that executes the computer readable and executable components stored in the memory. The processor can be operably coupled to: a plurality of sensors that sense ambient conditions associated with exterior and interior conditions of a vehicle; and a context component that determines context of an occupant of one or more occupants in the vehicle. The processor can also be operably coupled to a comfort model component that analyzes information from the plurality of sensors and the context component; and a comfort controller that adjusts environmental conditions of a passenger compartment of the vehicle based on an output from the comfort model component.

In another embodiment, a computer-implemented method is provided. The computer-implemented method can comprise sensing, using one or more sensors, ambient conditions associated with one or more conditions of a vehicle; and determining, by a device operatively coupled to a processor, context of an occupant of the vehicle. The computer-implemented method can also comprise analyzing, by the device, one or more ambient conditions and the context; and adjusting one or more environmental conditions of a passenger compartment of the vehicle based on the analyzing the one or more ambient conditions and the context.

In another embodiment, a computer program product for facilitating vehicle occupant comfort is provided. The computer program product can comprise a computer readable storage medium having program instructions embodied therewith. The program instructions can be executable by a processor to cause the processor to: sense, using sensors, one or more ambient conditions associated with interior conditions of a vehicle; and determine, by the processor, a context of one or more occupants of the vehicle. The program instructions can also be executable to analyze, by the processor, the one or more ambient conditions and the context; and adjust, by the processor, one or more conditions associated with the vehicle based on the one or more ambient conditions and the context.

In some embodiments, elements of one or more computer-implemented methods can be embodied in different (or a combination of) forms. For example, one or more elements of a computer-implemented method may be embodied (without limitation) as (or with) a system, a computer program product, and/or another form.

DETAILED DESCRIPTION

Figure 1:
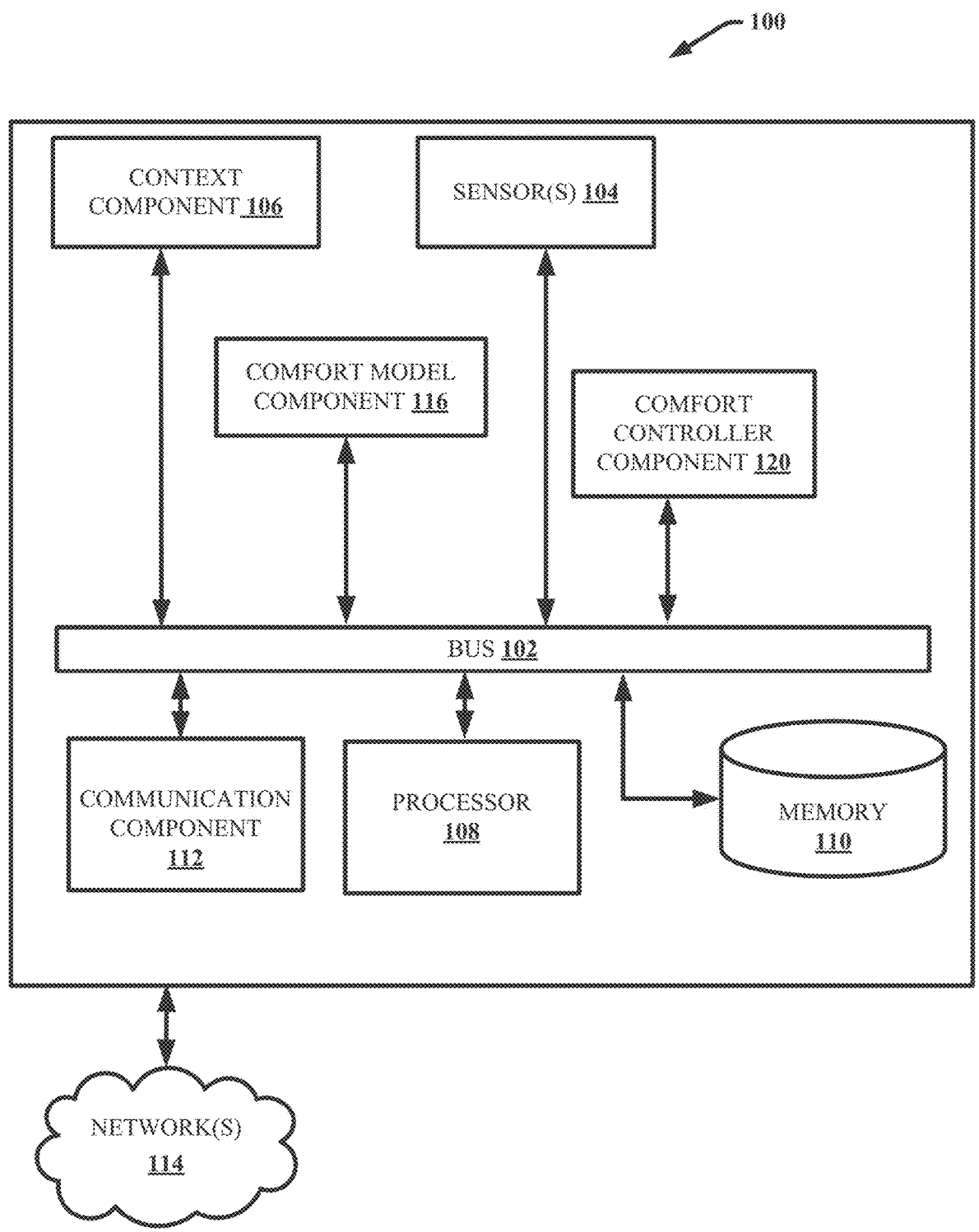
FIG. 1 illustrates a block diagram of an example, non-limiting system that utilizes machine learning systems to regulate environmental conditions within a vehicle to improve driving comfort in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

One or more embodiments of the subject disclosure describes utilizing machine learning systems to regulate environmental conditions within a vehicle to improve driving comfort in accordance with one or more embodiments described herein.

The number of drivers and associated driving time keep increasing rapidly year by year. Driving is an important activity in daily life. Research shows that driving comfort might be spoiled due to various reasons, including foul air, vibration and noise, stress, fatigue, uncomfortable heat and humidity, narrow space and fixed position, etc. Embodiments described and claimed herein utilize machine learning systems that have been explicitly or implicitly trained to learn, determine or infer occupant comfort and dynamically regulate environmental conditions of the vehicle to facilitate achieving occupant comfort. For example, and as will be described in greater detail below, historical occupant comfort levels, occupant preferences, occupant context, ambient conditions inside and outside of the vehicle, vehicle or occupant state conditions, vehicle zones, multiple occupant preferences and comfort, occupant zones and/or intersection areas of occupant zones are some of the many factors that can be taken into consideration by the machine learning system in connection with regulating vehicle environmental conditions to achieve occupant comfort.

The subject disclosure is directed to computer processing systems, computer-implemented methods, apparatus and/or computer program products that facilitate efficiently and automatically (e.g., without direct human involvement) regulating vehicle environmental conditions utilizing machine learning to help achieve occupant comfort. Humans are also unable to perform the embodiments described here as they include, and are not limited to, performing, e.g., complex Markov processes, Bayesian analysis, or other artificial intelligence based techniques based on probabilistic analyses and evaluating electronic information indicative of occupant comfort, determining whether countless multitudes of probability values assigned to occupant comfort exceed or fall below various probability values.

The computer processing systems, computer-implemented methods, apparatus and/or computer program products employ hardware and/or software to solve problems that are highly technical in nature. For example, problems are related to automated processing, determining or inferring occupant comfort. These problems are not abstract and cannot be performed as a set of mental acts by a human. For example, a human, or even thousands of humans, cannot efficiently, accurately and effectively manually apply countless thousands of occupant comfort variables to input points and perform analysis to determine that a probability value assigned to a occupant comfort level exceeds a defined probability value.

In order to provide for or aid in the numerous inferences described herein (e.g., inferring occupant comfort), components described herein can examine the entirety or a subset of data to which it is granted access and can provide for reasoning about or inferring states of a system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

FIG. 1 illustrates a block diagram of an example, non-limiting system 100 that facilitates utilizing machine learning (or probabilistic modeling) to regulate environmental conditions of a vehicle to facilitate occupant comfort in accordance with one or more embodiments described herein. Aspects of systems (e.g., non-limiting system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

In various embodiments, system 100 can be any type of mechanism, machine, device, facility, apparatus, and/or instrument that includes a processor and/or is capable of effective and/or operative communication with a wired and/or wireless network. Mechanisms, machines, apparatuses, devices, facilities, and/or instrumentalities that can comprise non-limiting system 100 can include, but are not limited to, vehicles, planes, recreational vehicles (RVs), vessels, trains, passenger cabins, homes and/or mobile homes and can be implemented at least in part utilizing a variety of devices or appliances including, but not limited to, tablet computing devices, handheld devices, server class computing machines and/or databases, laptop computers, notebook computers, on-board vehicle computing devices or systems, desktop computers, cell phones, smart phones, consumer appliances and/or instrumentation, industrial and/or commercial devices, hand-held devices, digital assistants, multimedia Internet enabled phones, multimedia players, and the like.

The system 100 can include a bus 102 that can provide for interconnection of various components of the system 100. It is to be appreciated that in other embodiments one or more system components can communicate wirelessly with other components, through a direct wired connection or integrated on a chipset. The system 100 can include one or more sensors (e.g., sensors that detect temperature, pressure, light, image, humidity, pollution, smell, smoke, draft, moisture, air quality, particulate, accelerometers, vibration, noise, tone, weight, etc.) that collect information regarding environments external and/or internal to a vehicle, occupants and the vehicle itself and its associated equipment. In some embodiments, context component 106 can collect and provide contextual data regarding the vehicle and/or vehicle occupants. For example, context information such as what activity (e.g., running, swimming, having lunch, sleeping, drinking, etc.) in which an occupant was engaging prior to entering the vehicle can be determined or inferred. Likewise, context information regarding destination of the occupant and/or vehicle, and/or regarding operational information about the vehicle can be collected and provided to the system 100 for analysis in connection with regulating vehicle environment to facilitate occupant comfort.

The context component 106 can, for example, obtain context information from many different sources e.g., an occupant cell phone, calendar, email, GPS, appliances, third parties, the vehicle, etc. The system 100 can include a processor 108 and memory 110 that can carry out computational and/or storage operations of the system 100 as described herein. A communications component 112 can provide for transmitting and receiving information (e.g., through one or more internal or external networks 114 (wired or wireless networks)). A comfort model component 116 can be an explicitly and/or implicitly trained machine learning component trained to determine and/or infer level of occupant comfort and can determine and/or infer adjustments to environment of the vehicle to facilitate occupant comfort. A comfort controller component 120 can regulate one or more vehicle components (e.g., air conditioner, heater, humidifier, de-humidifier, lights, stereo, noise cancellation components, shock absorbers, seats, pressure regulators, filters, pumps, motors, steering components, defogger, de-icer, seat warmers, seat coolers, displays, etc.) based on output from the comfort model component 116 to facilitate achieving a vehicle environment conducive to occupant comfort.

In an example, non-limiting implementation, a driver can enter a vehicle and the context component 106 can determine from a mobile device of the occupant (e.g., via a BLUETOOTH® or other wired or wireless connection) that the occupant just finished a hot yoga class and/or can determine (e.g., via a wearable computing device) that the occupant has an elevated body temperature, is exhausted and in a rush to get home to clean up, dress and attend a meeting in one hour. This context information can be shared with the comfort model component 116, which can perform a probabilistic-based analysis on the context information as well as information from the sensor(s) 104, occupant preference and historical data stored in memory, state information and/or other information that have relevancy to occupant comfort. The comfort model component 116, based on the analyses, can output one or more recommendations that can be utilized by the comfort controller component 120 to adjust environmental conditions of the vehicle to facilitate achieving occupant comfort. For example, the comfort model component 116, based on occupant context information regarding just completing hot yoga, having elevated body temperature, being under some stress and in a slight rush, can generate an inference that the occupant will need a cooler cabin temperature than normal in order to be quickly cooled down and feel comfortable. Additionally, the comfort model component 116 can activate the in seat massage components built into the driver's seat of the vehicle as well as play relaxing music, adjust shock absorbers to provide a softer ride, and adjust lighting in the cabin to effect a calming vehicle environment. The context component 106, and sensors 104 can continually collect data that is analyzed by the comfort model component 116, which will generate determinations or inferences regarding level of occupant comfort. The comfort controller component 120 can continually adjust vehicle environmental conditions to maintain occupant comfort. For example, as the occupant is starting to cool down, the comfort controller component 120 can adjust temperature by raising temperature slightly, reduce force of fans blowing air on occupant, slow down or cease the seat massage, change volume of music, etc. Thus, the system 100 is adaptive and can employ closed or open-looped systems to facilitate maintaining occupant comfort even as conditions of the occupant change. It is to be appreciated that the described and claimed subject matter contemplates and is intended to cover self-driving vehicles.

Figure 2:
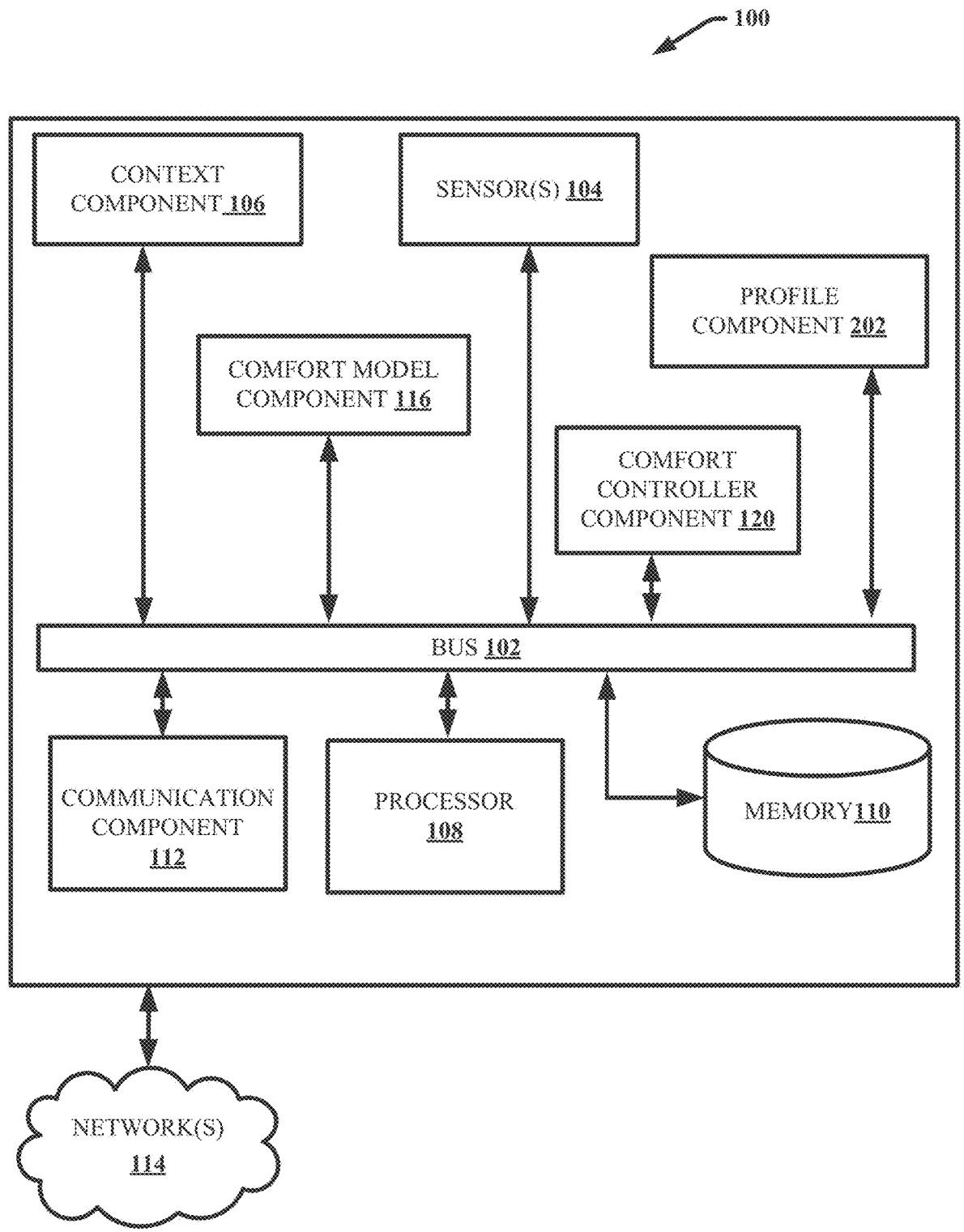
FIG. 2 illustrates a block diagram of an example, non-limiting system that utilizes machine learning systems to regulate environmental conditions within a vehicle to improve driving comfort in accordance with one or more embodiments described herein.

FIG. 2 illustrates a block diagram of an example, non-limiting system 200 that utilizes machine learning systems (or probabilistic modeling) to regulate environmental conditions within a vehicle to improve driving comfort in accordance with one or more embodiments described herein.

FIG. 2 illustrates an implementation of system 11 that includes a profile component 202 that builds and stores in memory 110 vehicle occupant comfort profiles. An owner of a vehicle is commonly a frequent user of the vehicle, and the comfort model component 116 can build a specific model for the owner as well as respective models for other frequent occupants (e.g., family members, close friends, pets . . . ). Upon identification of an occupant having entered the vehicle, e.g., via facial recognition, seating pattern (e.g., body contours, weight, etc.), biometrics, voice recognition, iris recognition, cell phone, car keys, or any other suitable means for identification and authentication, the profile component 202 can access specific profiles for each occupant of the vehicle that can be utilized by the comfort model component 116 to generate determinations or inferences regarding occupant comfort level and generating recommendations to the comfort controller component 120 to adjust environment of the vehicle to achieve occupant(s) comfort. It is to be appreciated that when multiple occupants are in the vehicle, their respective profiles may conflict in certain aspects, e.g., temperature preference, volume preference, music preference, lighting preference, etc.

The comfort model component can utilize the respective profiles and specific occupant models to achieve a happy medium that achieves levels of comfort suitable for most or all occupants. A utility-based analysis can also be employed where the costs of taking a certain action are weighed against the benefits. For example, if a passenger prefers loud music but such music is a dangerous distraction for the driver who loses focus of attention when exposed to loud music, the comfort model component 116 may determine or infer that the probability and cost of getting into an accident outweighs the benefit of playing such music. The comfort model component 116 can also generate recommendations to the comfort controller to adjust environment of respective zones of the vehicle differently based on occupants within each zone. Additionally, if the comfort model component 116 determines or infers that a driver of the vehicle is fatigued or drowsy, the comfort model component 116 can drive the comfort controller component 120 to make adjustments to the environment (e.g., decrease temperature, increase stereo volume, increase brightness of display and vehicle interior, etc.) to increase level of alertness of the driver. Optionally, the system 100 can provide a notification to the driver to pull over and rest.

Figure 3:
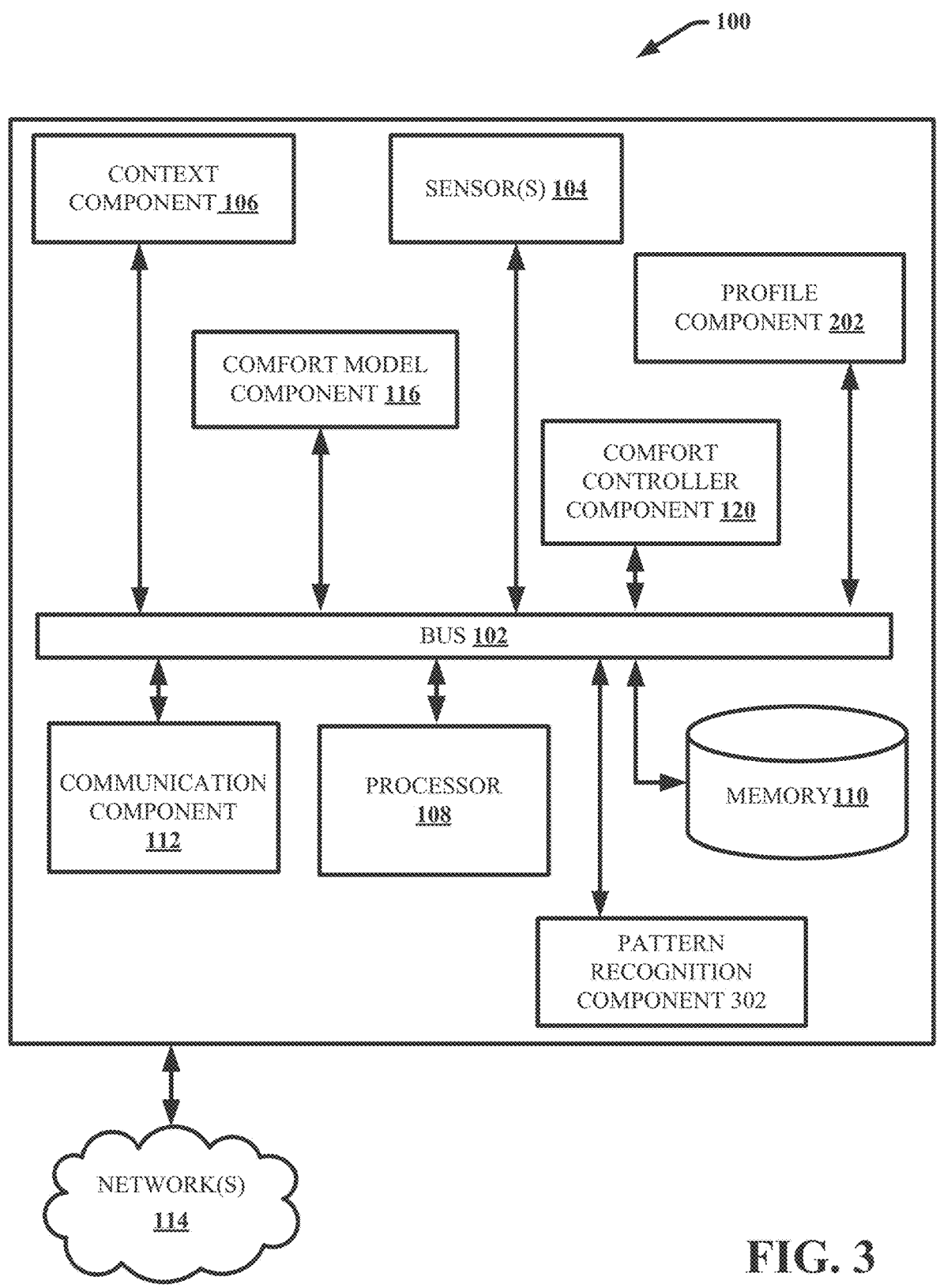
FIG. 3 illustrates a block diagram of an example, non-limiting system that utilizes machine learning systems, including a pattern recognition component, to regulate environmental conditions within a vehicle to improve driving comfort in accordance with one or more embodiments described herein.

FIG. 3 illustrates an alternative implementation of system 100 that includes a pattern recognition component 302. A set of the sensors 104 can include cameras that collect image data inside and outside of the vehicle. The pattern recognition component 302 can be employed to identify occupants, collect facial expression information that can be analyzed by the comfort model component 116 to assess state of occupant(s), e.g., tired, hot, cold, sleepy, alert, sad, happy, nervous, stressed, etc. Based on such determination or inference, the comfort model component 116 can generate recommendations to the comfort controller component 120 to adjust vehicle environment. Additionally, the pattern recognition component can facilitate determining vehicle driving conditions, e.g., the window appears fogged and thus the comfort model component 116 can direct the comfort controller component 120 to defog the windows. The pattern recognition component 302 can detect outside environmental activity, e.g., road conditions, traffic, weather, pedestrians, moving objects, etc. that can be utilized by the comfort model component 116 to instruct the vehicle to regulate operation, e.g., slow down, brake, swerve, switch to low gear, turn on high beams, honk the horn, etc. In another example, the pattern recognition component 302 and possibly a light detection sensor 104 could determine that incoming sunlight is distractive to a driver, and automatically activate window tinting or movement of a motorized visor to mitigate impact of sunlight or glare.

Figure 4:
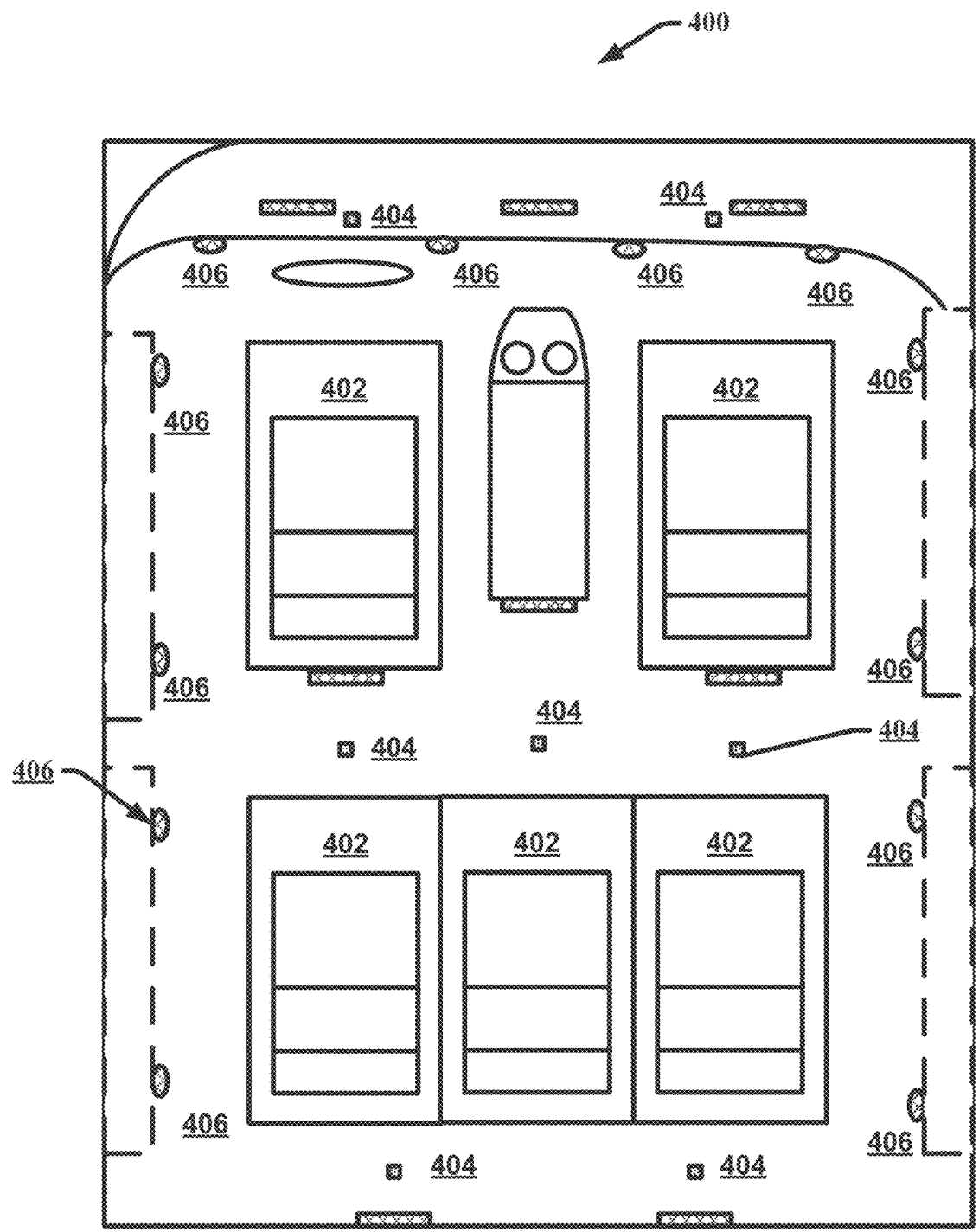
FIG. 4 illustrates a schematic block diagram of an example vehicle that utilizes machine learning systems to regulate environmental conditions within to improve driving comfort in accordance with one or more embodiments described herein.

FIG. 4 illustrates an example, non-limiting, schematic representation of a vehicle interior 400. The interior 400 includes a set of occupant seats 402 that can include sensors (e.g., weight, temperature, moisture, etc.) and environmental comfort components (e.g., seat heaters, coolers, massage components, seat adjustment components, vents, blowers, etc.) that can be regulated by the comfort model component 116 to facilitate occupant comfort. Cameras 404 can be situated about the vehicle cabin to collect image information. Vents/blowers 406 can be situated throughout the vehicle to facilitate temperature regulation as well as humidity. Additional sensors 408 can be located at various locations within and outside of the vehicle cabin. These sensors can collect information regarding state of the vehicle and/or occupants (e.g., temperature, light, moisture, pressure, weight, ice formation, noise, etc.). As discussed above, the vehicle can be divided into respective zones (e.g., rear right side, rear center, rear left side, driver side, front passenger side) and information regarding the respective zones and occupants therein can be collected (e.g., via sensors 104, 408 and context component 106) and the collected information analyzed by the comfort model component 116 to infer or determine respective occupant comfort in the zones. Based on the inference or determination, the comfort model component can direct the comfort controller component 120 to adjust environmental conditions (e.g., seat position, seat temperature, blower intensity, zone temperature, zone moisture level, zone noise level, music volume, zone lighting, massage, window tint, visor position, heads-up display, entertainment, wireless signal strength, video, entertainment choices, headset volume, display features, etc.) in respective zones to facilitate occupant comfort in each zone. For example, a family enters the vehicle cabin 400 and the context component 106 can determine that the family is going on an 8 hour car trip to a vacation destination. The sensors 104, along with pattern recognition component 302 can facilitate identifying which family member is seated in a particular seat. The comfort model component 116 can utilize profiles generated by the profile component 202 to generate inferences and determinations regarding suitable environmental conditions for each passenger in their respective zones to facilitate comfort for each family member. Based in part on output from the comfort model component 116, the comfort controller component 120 can adjust each zone respectively to facilitate occupant comfort, e.g., configure seat positions based passenger preferences and context, regulate temperature and humidity in each zone, control type and volume and display of entertainment per passenger preference. The system 100 can continually monitor occupant state, context and comfort levels and dynamically adjust environmental conditions. For instance, if the rear passengers fall asleep, the comfort controller component 120 can raise temperature in the rear, reduce lighting, reduce volume of music, decline seats, etc. to facilitate sound sleeping comfort. Additionally, if the system 100 deems that it is time for the passengers to take a break and walk to circulate blood throughout the body and stretch, the system 100 can send the driver a notification to pull over at the next rest station for a break and to refuel the vehicle.

Figure 5:
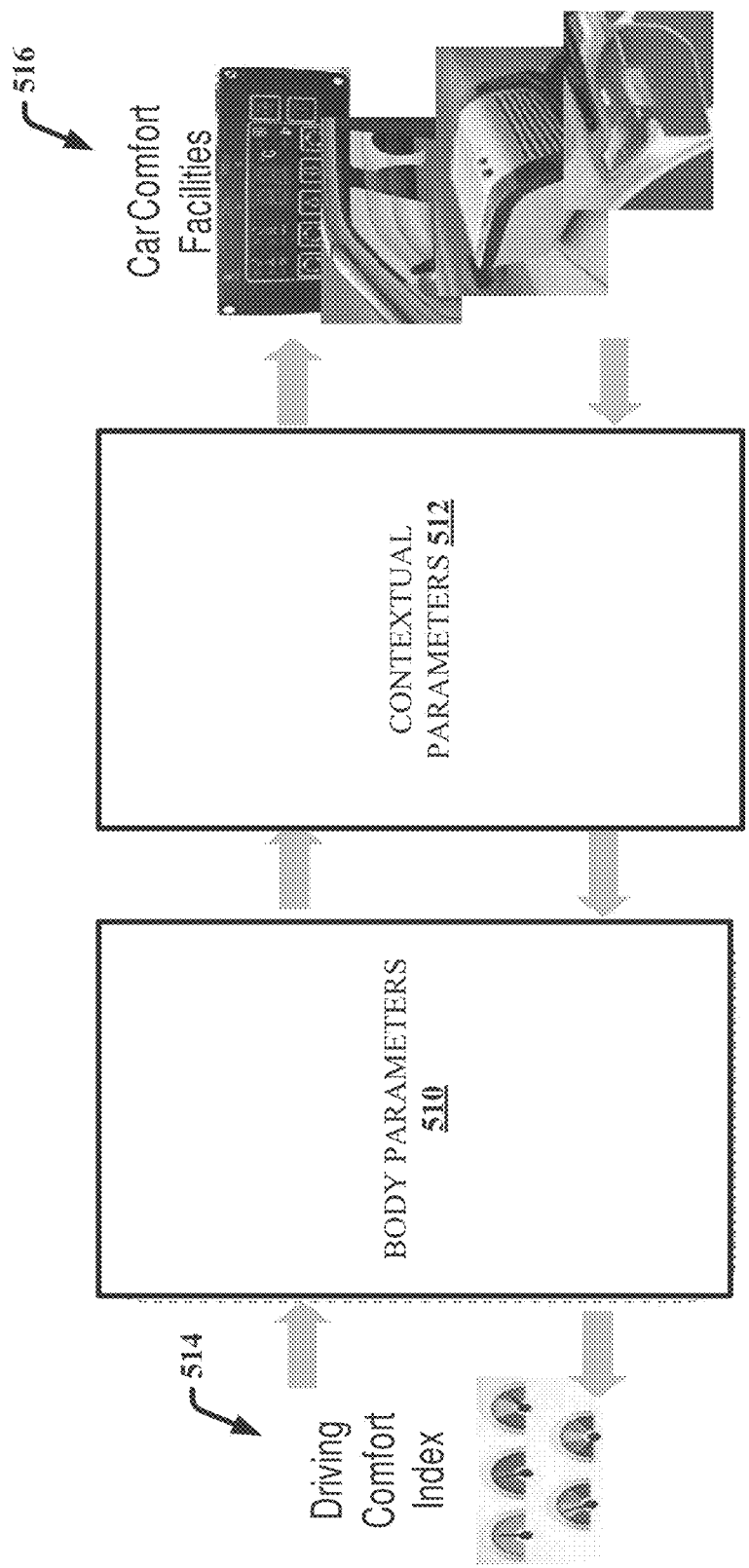
FIG. 5 illustrates example non-limiting body and contextual parameters that influence driving comfort in accordance with one or more embodiments described herein.

FIG. 5 illustrates various example, non-limiting body parameters 510 (e.g., blood pressure, heart rate, pulse, skin temperature, respiratory rates, skin humidity, blood oxygen saturation . . . ) and contextual parameters 512 (e.g., in/out car air temperature, in/out car humidity, in/out car pm2 5/TVOC, in/out car db value, in/out car light intensity . . . ) that can be utilized to assess diving car comfort index 514 and regulate car comfort facilities 516. A model can be built for inferring individual occupant comfort degree based on his/her body parameters and contextual parameters. The model can analyze contextual parameters that damage occupant(s) comfort when analyzed occupant(s) are determined or inferred to be un-comfortable. Vehicle facilities can be adjusted appropriately to improve upon the damaging contextual parameters and occupant comfort degree change can be utilized as feedback for optimization.

Figure 6:
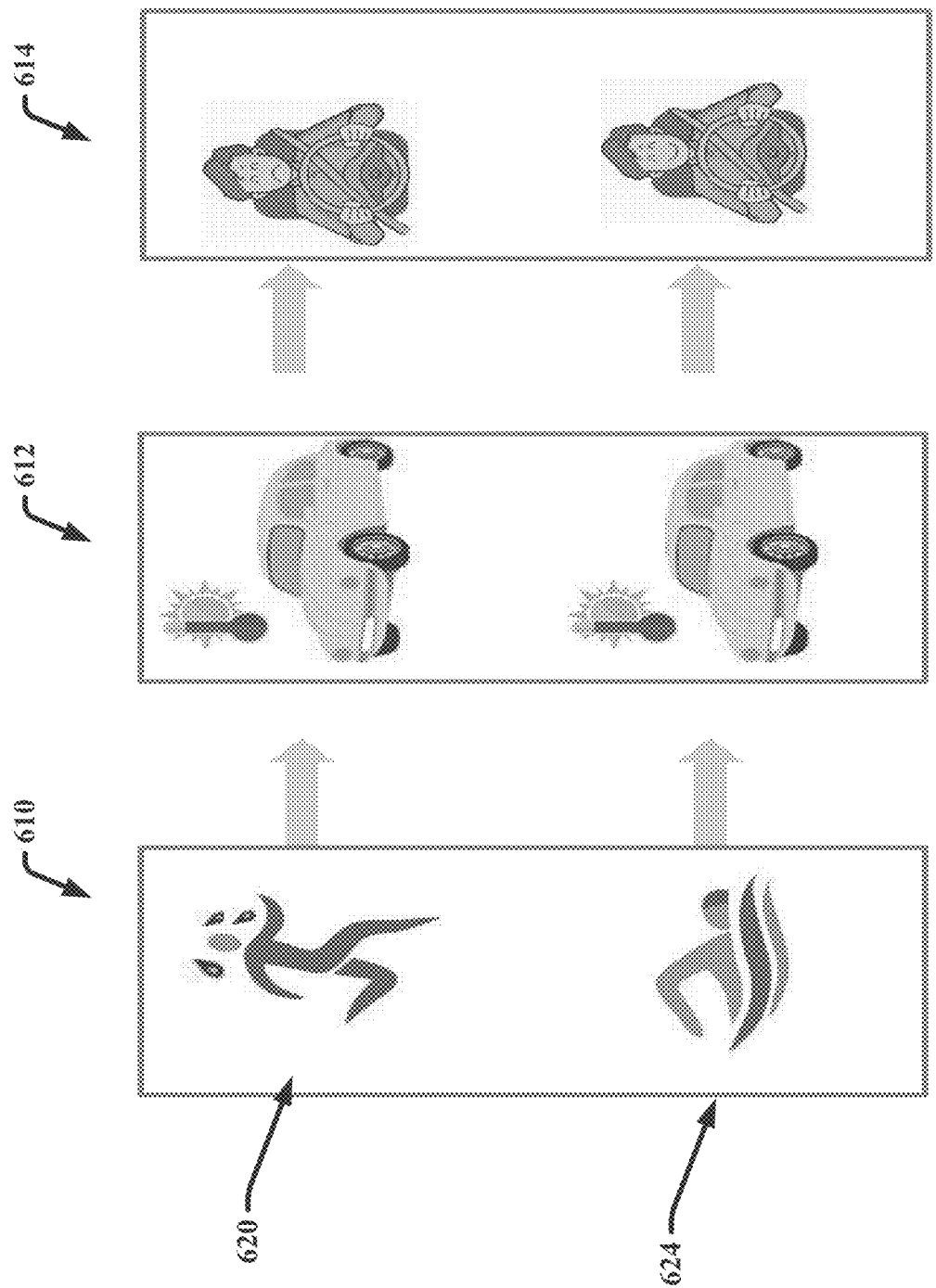
FIG. 6 illustrates example non-limiting body sensor and contextual data that influence vehicle occupant comfort in accordance with one or more embodiments described herein.

FIG. 6 illustrates that occupant state 610 and occupant context 612 can factor occupant comfort level 614 and that such state/contextual information can be used by the system 100 to regulate environment of the vehicle to facilitate occupant comfort. For example, if a same occupant is running 620 prior to entering a vehicle, he/she may feel more comfortable at a cooler temperature as compared to if the occupant just finished swimming 624 in a cool pool. Accordingly, data collected from body sensors can indicate an occupant's current body condition which can impact his/her feelings in connection with driving contextual parameters. The system 100 can factor such contextual data (e.g., prior and current state and/or context) to adjust vehicle environmental conditions to facilitate comfort.

Figure 7:
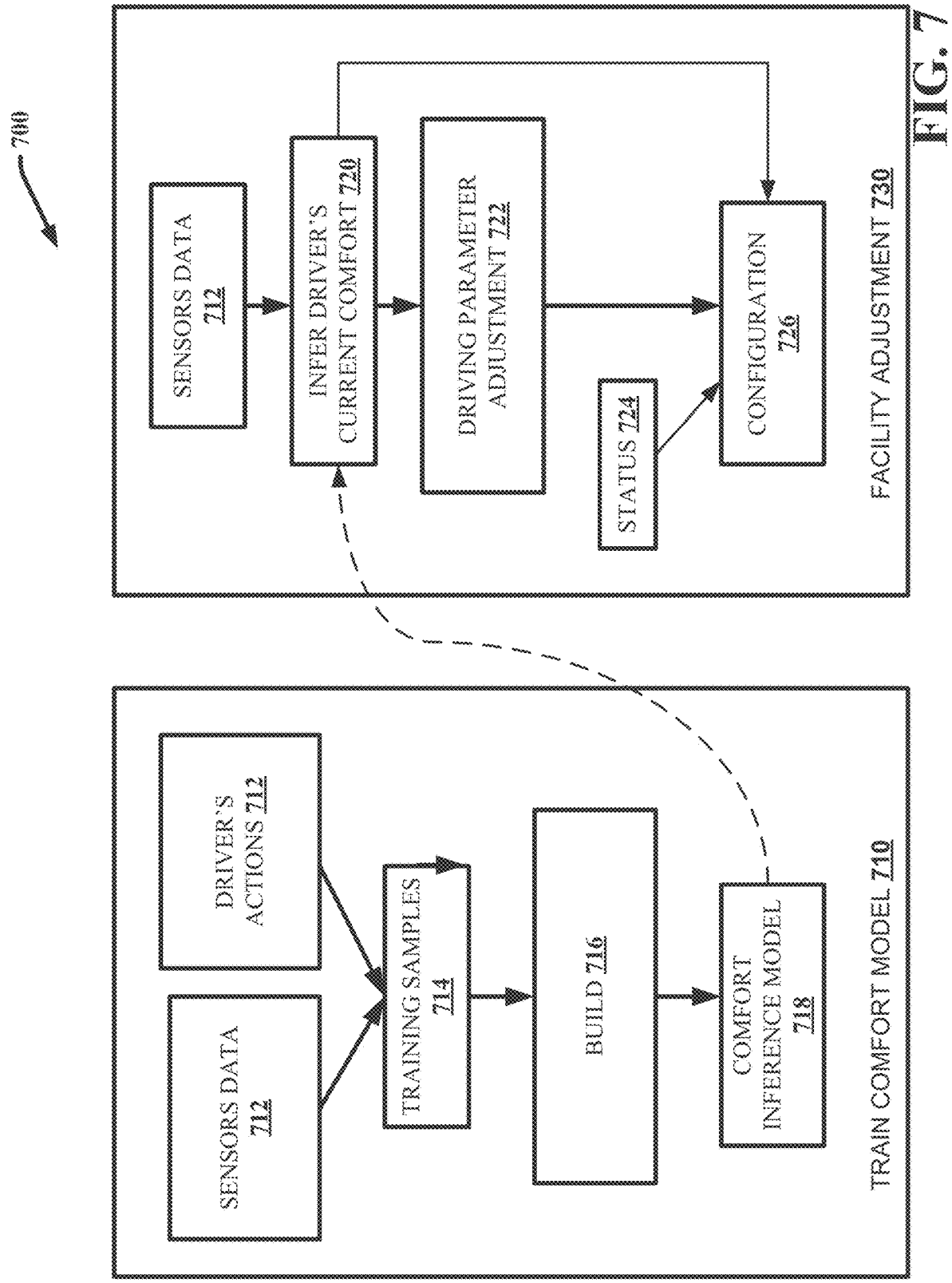
FIG. 7 illustrates an example of training a comfort model and utilizing such trained model to adjust vehicle comfort facilities in accordance with one or more embodiments described herein.
Figure 8:
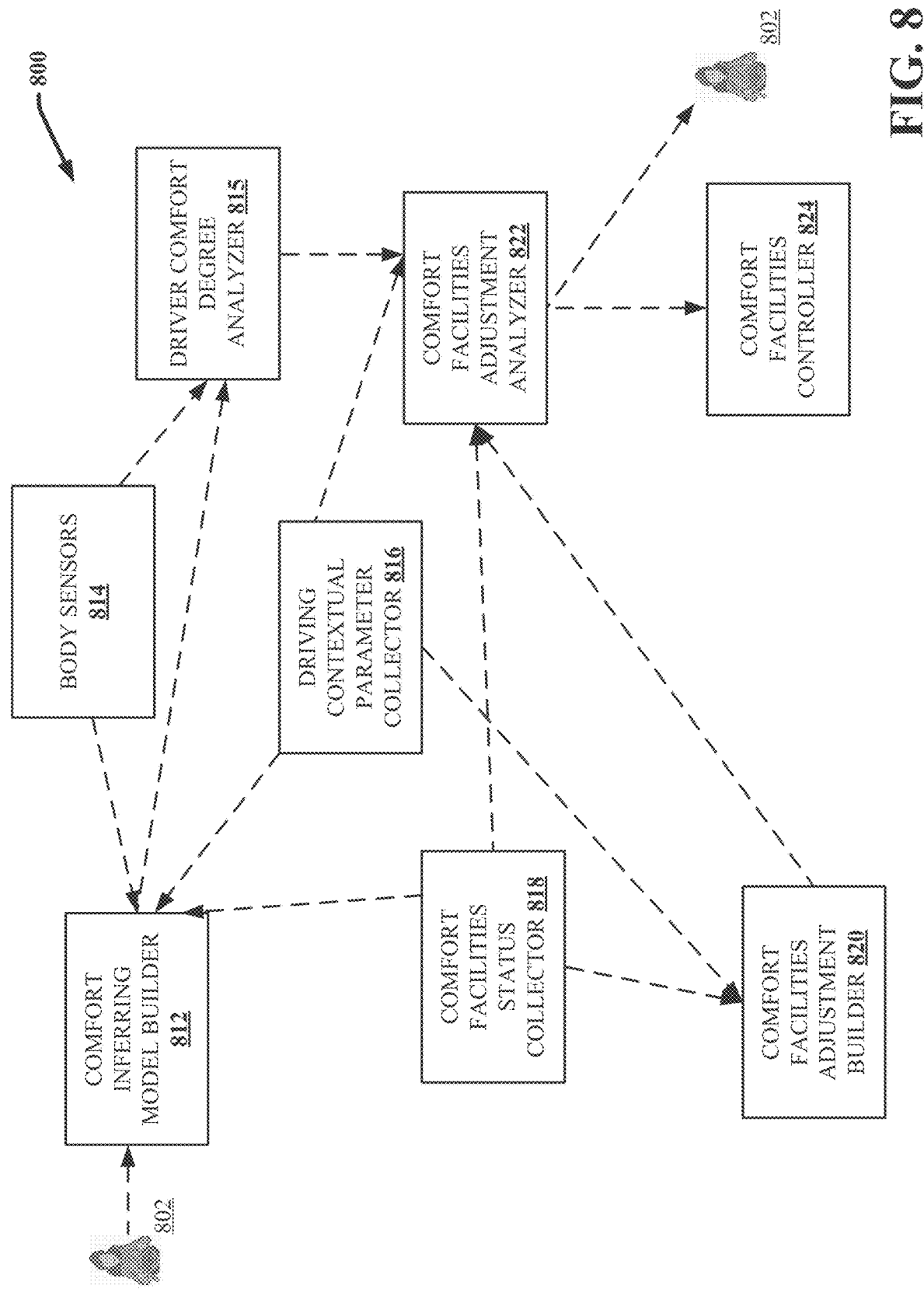
FIG. 8 illustrates an example system architecture that implements one or more embodiments described herein.

FIGS. 7 and 8 illustrate example architectures that facilitate training comfort model(s) and vehicle facility adjustment in accordance with embodiments described herein. A continuous comfort index rather than conventional notion of simplistic comfort/un-comfort is in more accordance with nature of a human's feeling regarding comfort. A continuous comfort index allows for a better occupant experience by allowing for improving upon degree of comfort. For example, the system 100 can suggest adjusting the air conditioning (AC) from 28 C to 26 C in order to improve one's comfort index from 0.8 to 0.9. A conventional comfort/un-comfort based approach cannot accomplish such real-time automated refinement to facilitate occupant comfort. A continuous comfort index allows finer granular and more cost effective control on vehicle facilities. For example, it can cost less to adjust to improve comfort index from 0 to 0.6 than to a static 1.0. The conventional comfort/un-comfort based approach accomplish such fine tuning due to its static nature.

With reference to FIG. 7, an architecture 700 for training a comfort model 710 is shown. Body and contextual sensors data 710 and driver's actions data regarding car facilities with pre and post facility status 712 are utilized to construct training samples 714. Thereafter, a build 716 is performed to generate a comfort inference model 718 using traditional machine learning (e.g., regression). Inferences regarding driver's comfort 720 are utilized in connection with adjustment(s) 722 (e.g., determine potential driving environmental parameters that can be adjusted to improve driving comfort) and collected car comfort status 724 are utilized for configuration 726 of comfort facilities (e.g., employing feedback regarding inferred driver's current comfort 720) to realize content adjustment in connection with overall facility adjustment 730 to achieve occupant comfort.

Referring now to FIG. 8, an architecture 800 is shown that facilitates achieving and maintaining occupant comfort 802. A comfort inferring model builder 812 builds a model that infers occupant comfort within a vehicle utilizing data receiving from body sensors 814 (e.g., body temperature, blood pressure, heart rate, glucose level, fatigue, drowsiness, alertness . . . ), driving contextual parameter collector 816 (e.g., prior or current activities . . . ), and a comfort facilities status collector 818 (e.g., state of comfort facilities). A driver comfort degree analyzer 815 determines or infers degree of driver comfort utilizing information received from the body sensors 814 and the comfort inferring model builder 812. A comfort facilities adjustment builder 820 receives data from the comfort facilities status collector 818, the driving contextual parameter collector 816 and builds a model for adjusting comfort facilities. A comfort facilities adjustment analyzer 822 analyzes comfort facilities utilizing information from the driver comfort degree analyzer 815, the driving contextual parameter collector 816 the comfort facilities status collector 818 and the comfort facilities adjustment builder 820 to generate adjustments to be made by a comfort facilities controller 824 that regulates vehicle environment (e.g., temperatures, sound, humidity, air circulation, vibration, massage, lighting, etc.) in connection with facilitating occupant comfort 802.

Figure 9:
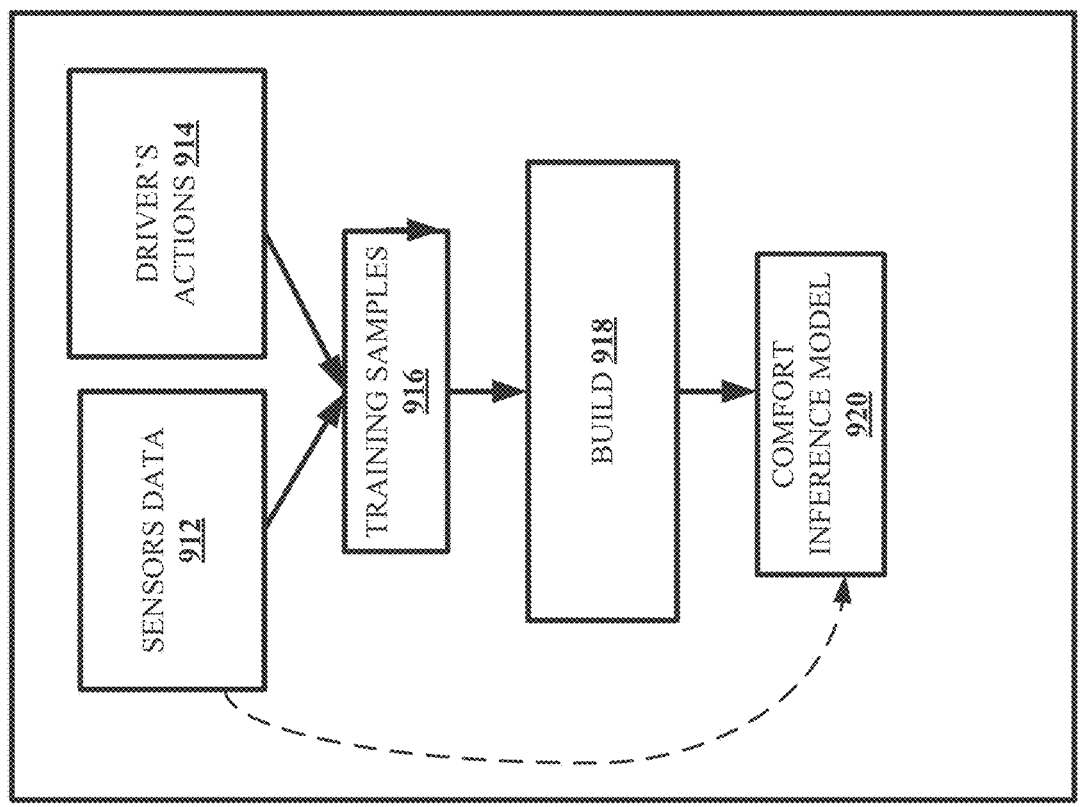
FIG. 9 illustrates an example of inferring driving comfort index based at least in part on body and contextual sensor data in accordance with one or more embodiments described herein.

FIG. 9. illustrates an architecture 900 for inferring occupant comfort in connection with a driver's adjustment on car facilities as a "un-comfort" indicator, the number of actions, and gap of facilities status before and after the actions are used for comfort index calculation. For example, one can adjust air conditioning (AC) from 28 C to 26 C if an occupant feels a little hot, and will adjust the AC to 24C if the occupant is very hot. For example, referring to Table 1 below, exemplary dependent variables (e.g., features) are listed in connection with driving comfort index (0-1).

TABLE 1

| NAME | CATEGORY | EXAMPLE |
|---|---|---|
| Heartbeat | Body sensor data | 75 times |
| Skin temperature | Body sensor data | 35.8 C. |
| Respiratory rates | Body sensor data | 16 times |
| Skin humidity | Body sensor data | 48% (RH) |
| Blood oxygen saturation | Body sensor data | 99% |
| In-car air temperature | Contextual sensor data | 29 C. |
| In-car humidity | Contextual sensor data | 55% (RH) |
| In-car pm 2.5 | Contextual sensor data | 87 |
| In-car tvoc | Contextual sensor data | 0.6 |
| In-car db value | Contextual sensor data | 32 db |
| In-car light intensity | Contextual sensor data | 100 ux |

Referring back to FIG. 9, an architecture 900 for training a comfort model is shown. Body and contextual sensors data 912 and driver's actions on car facilities with pre and post facility status 914 are utilized to construct training samples 916. Thereafter, a build 918 is performed to generate a comfort inference model 920 using traditional machine learning (e.g., regression). Data from the sensors 912 are utilized to continually update the comfort inference model 920.

Figure 10:
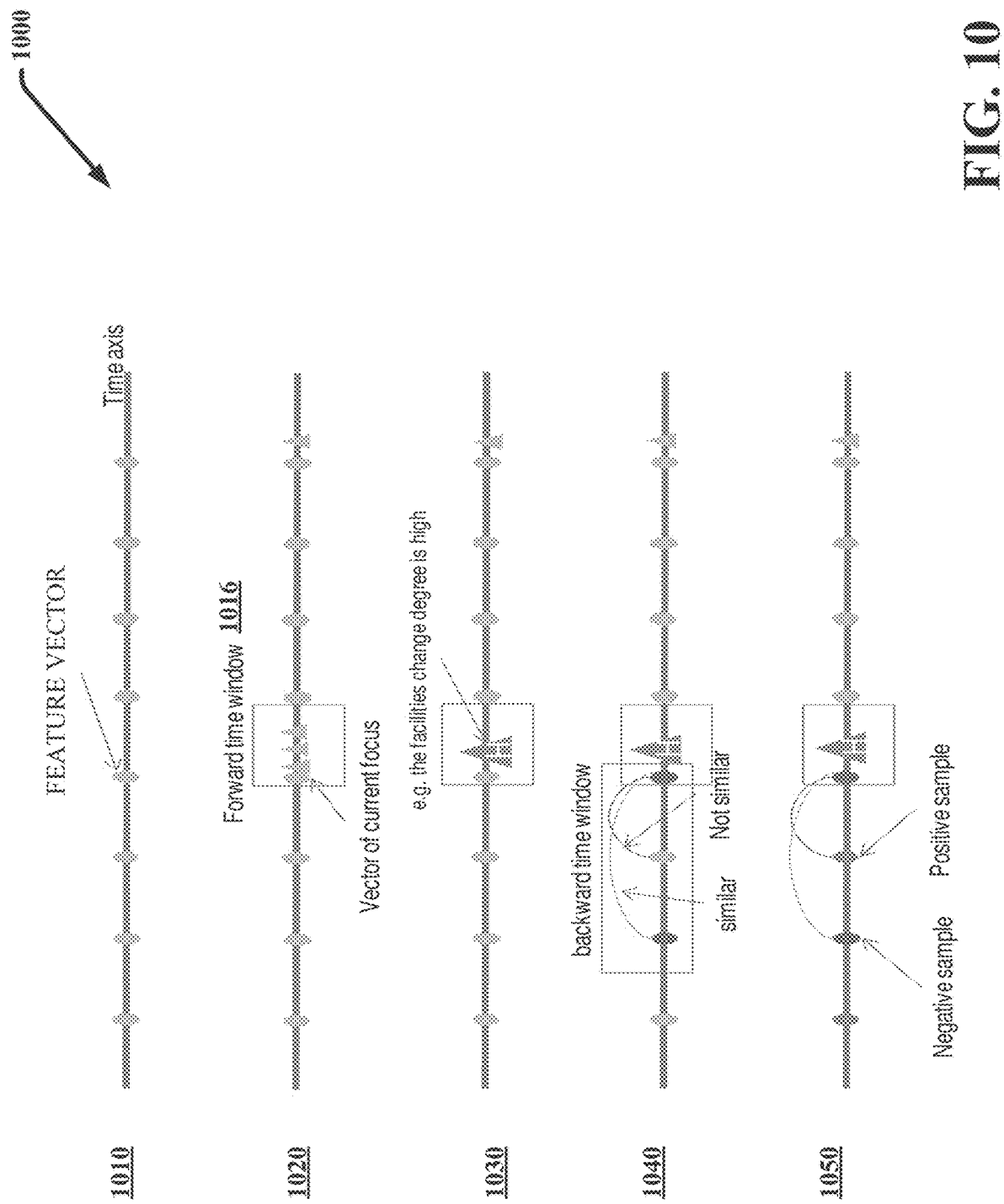
FIG. 10 illustrates example construction of training samples in accordance with one or more embodiments described herein.

FIG. 10 illustrates exemplary, non-limiting, construction of training samples 1000 in connection with comfort model training/building in accordance with embodiments described herein. At 1010, combined body and contextual sensors data are sampled at a same time point to form a feature vector (e.g., 75, 35.8, 16, 48, 99, 29, 55, 87, 0.6, 32, 100). At 1020, driver's actions are correlated to the vector is the actions occur within the vector's forward time window 1016. At 1030, the degree to which all correlated actions change status of car facilities are evaluated. At 1040, the current vector and its similar vectors in a backward time window are marked as "un-comfort" (e.g., positive samples). At 1050, other un-marked backward vectors are marked as "comfort" (e.g., negative samples). At 1060, a comfort index is calculated for the samples. It is to be noted that for positive samples the comfort index=1. For negative samples, the comfort index is calculated based on associated facilities adjustment degree.

Figure 11:
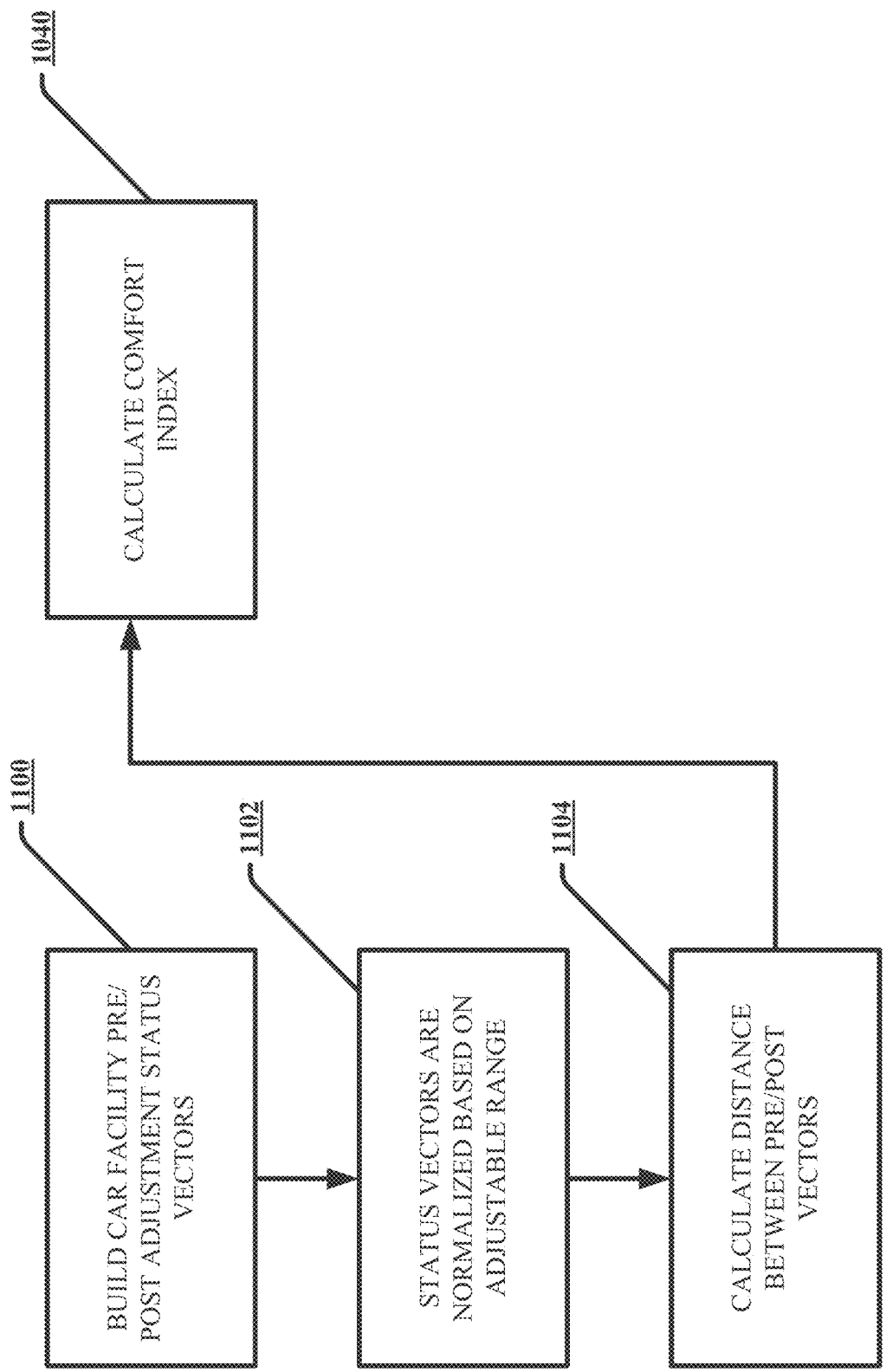
FIG. 11 illustrates an example calculation of comfort index for negative sample(s) in accordance with one or more embodiments described herein.

Referring to Table 2 below and FIG. 11, an example calculation of comfort index for negative sample(s) in accordance with one or more embodiments described herein is presented. At 1100, car facility pre/post adjustment status vectors are built (e.g., pre vector: (28, 50%, 0.8); post vector: (26, 0, 0.5). At 1102, status vectors are normalized based on adjustable range (e.g., pre vector: (0.8, 0.5, 0.8); post vector: (0.6, 0, 0.5) where 0.6=(26−20)/(30−20). At 1104, distance between pre/post vectors is calculated (e.g., Euclidean distance (pre-v, post-v)=0.62). At 1106, comfort index is calculated (e.g., comfort index=1−distance=0.38.

TABLE 2

| Car Facility | Pre-adjustment Status | Post-adjustment Status | Adjustable Range |
|---|---|---|---|
| AC | 28 C. | 26 C. | 20-30 C. |
| Window | 50% open | 0% open | 0-100% open |
| Radio sound volume | 0.8 Max | 0.5 Max | 0-1 Max |

Figure 12:
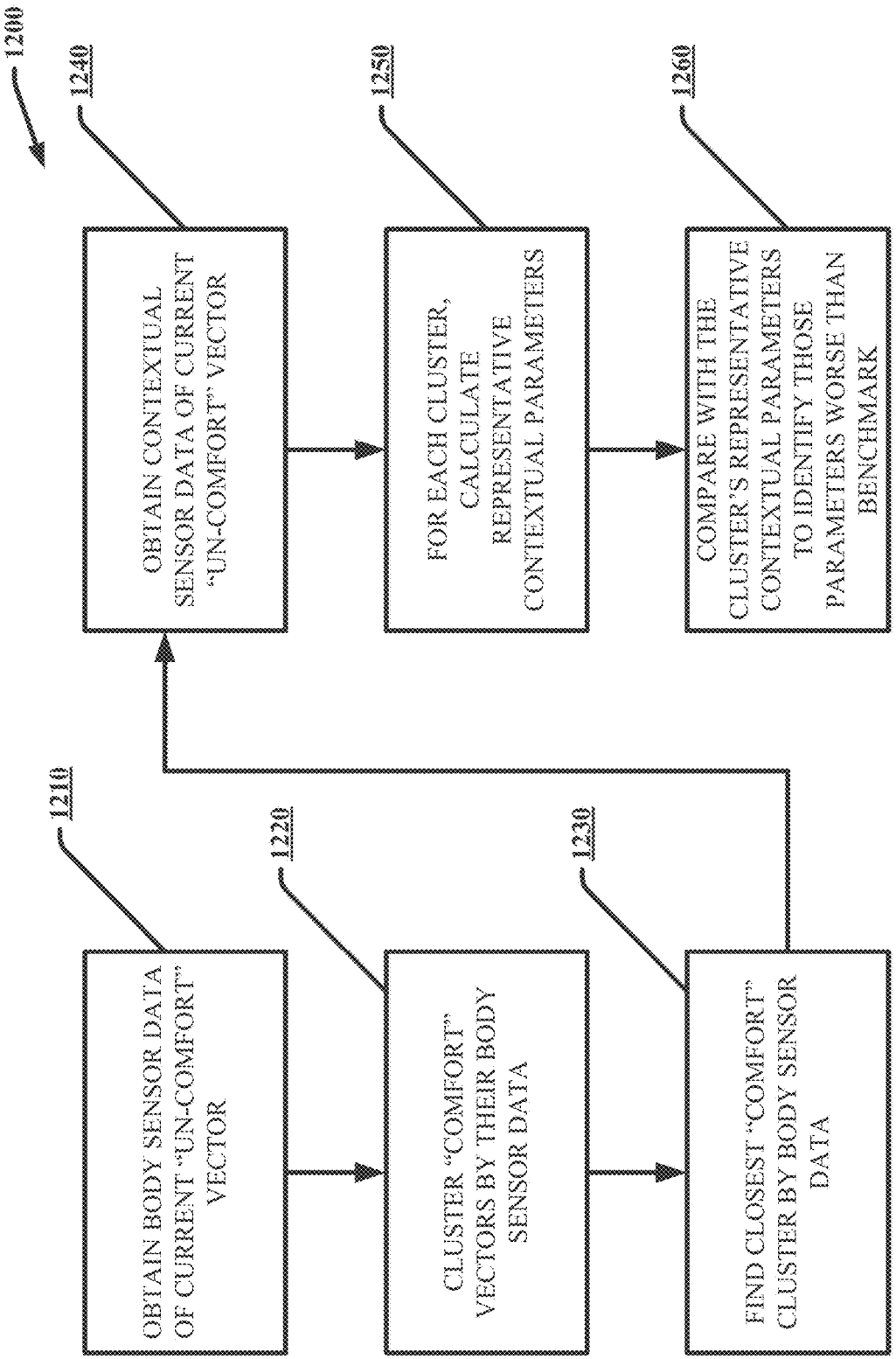
FIG. 12 illustrates an example of determining damaging driving environmental parameters in accordance with one or more embodiments described herein.

FIG. 12 illustrates a flow diagram of an example, non-limiting computer-implemented method 1200 for determination of damaging driving environmental parameters that can negatively impact occupant comfort. At 1210, body sensor data is obtained of a current "un-comfort" vector. At 1220, "comfort" vectors are clustered by respective body sensor data. At 1230, closest "comfort" clusters by body sensor data are found. At 1240, contextual sensor data of a current "un-comfort" vector is obtained. At 1250, for each cluster representative contextual parameters are calculated. At 1260, a comparison is made with the cluster's representative contextual parameters to identify those parameters worse than a benchmark.

Figure 13:
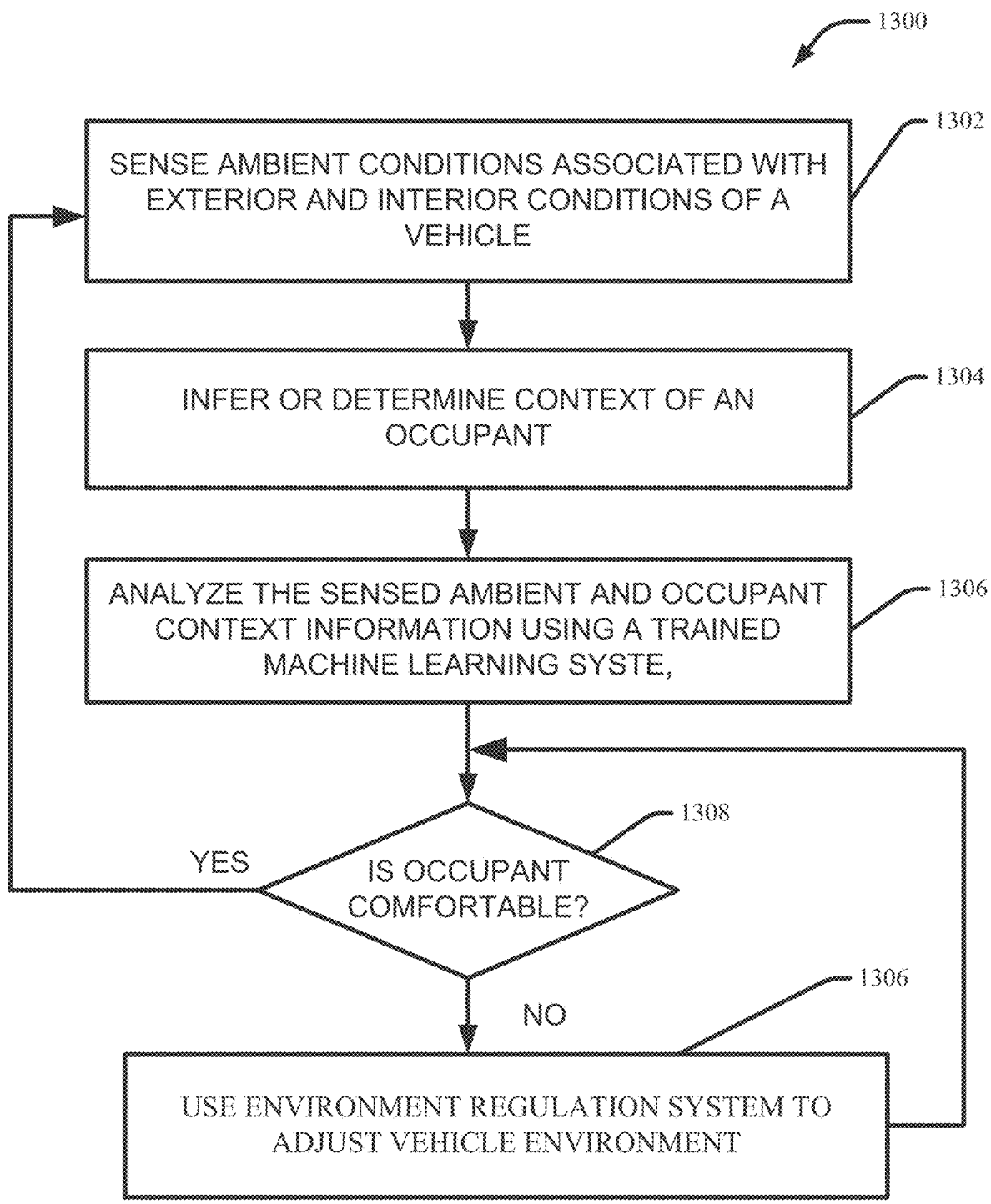
FIG. 13 illustrates an example flow diagram of regulating vehicle environment to facilitate occupant comfort in accordance with one or more embodiments described herein.

FIG. 13 illustrates a flow diagram of an example, non-limiting computer-implemented method 1300 that vehicle occupant comfort in accordance with one or more embodiments described herein. At 1302, ambient conditions associated with exterior and interior conditions of a vehicle are sensed, including but not limited to sensed information associated with the vehicle and/or occupants of the vehicle. For example, sensed information may include one or more of ambient temperature, light levels, odors, smoke, pollutants, allergens, pressure, moisture, sound levels, noise levels, weather conditions, road conditions, vehicle speed, and direction.

At 1304, occupant context can be determined or inferred (e.g., via a context component 106). For example, occupant context can include prior activities, current activities, stress level, emotional state, destination, upcoming events, attire, alertness, fatigue level, sleepiness level, focus of attention, mood, health state, etc. Extrinsic or intrinsic information regarding an occupant can be collected from a variety of sources (e.g., cell phones, GPS, email, text messages, calendars, appointments, wearable computing devices, cloud-based services, 3rd parties, the vehicle, etc.).

At 1306 the sensed information and occupant context information are analyzed using a trained machine learning system (e.g., comfort model component 116).

At 1308 a determination is made regarding whether or not the occupant is comfortable. For example, a comfort index can be utilized to assess whether the occupant is comfortable or if comfort can be improved upon. If Yes, the process returns to 1302. If No, an environmental regulation system (e.g., comfort controller component 120) is utilized to adjust environmental conditions until the occupant is deemed or inferred to be comfortable.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 14:
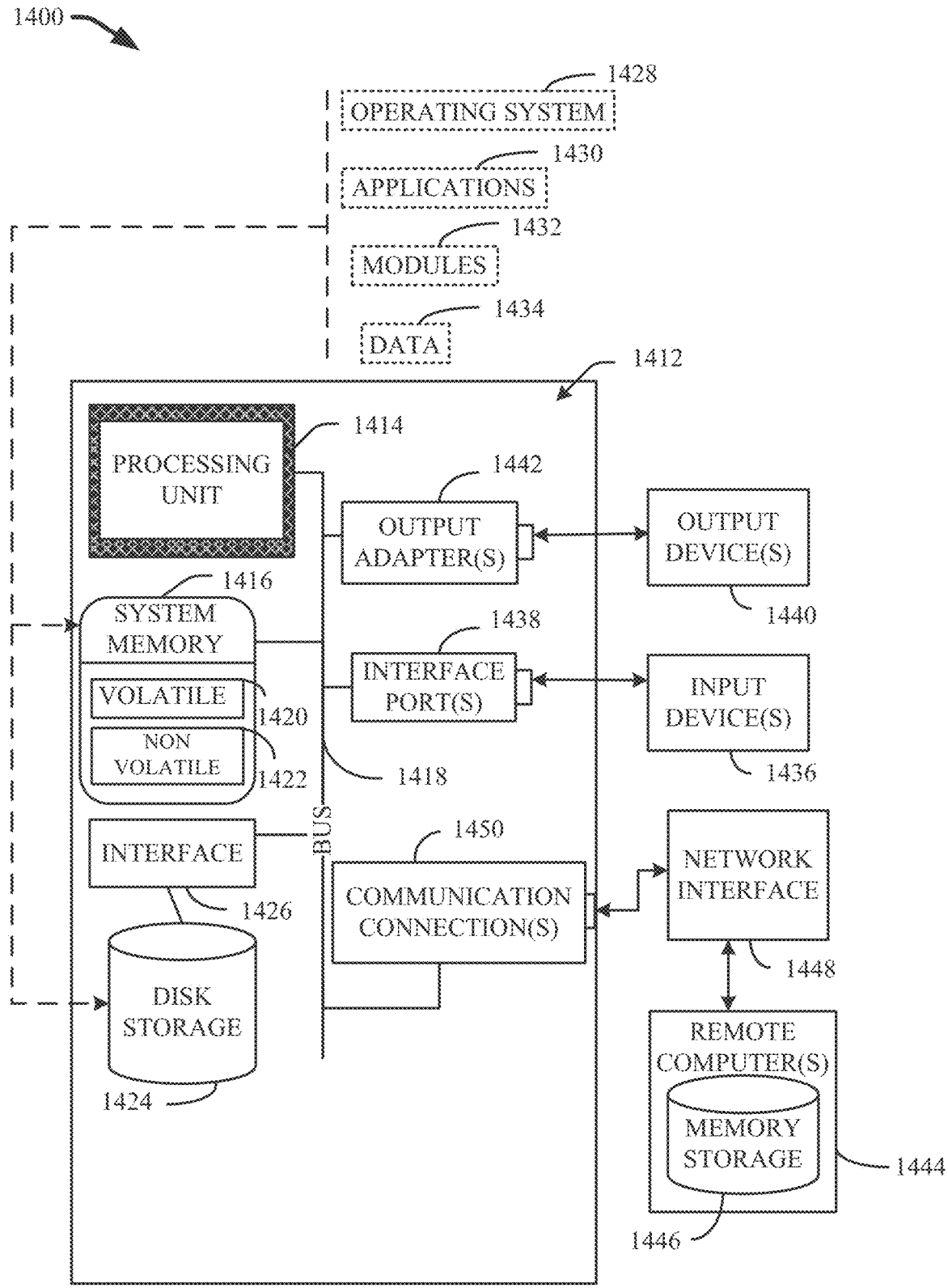
FIG. 14 illustrates a block diagram of an example, non-limiting operating environment in which one or more embodiments described herein can be facilitated.

In order to provide a context for the various aspects of the disclosed subject matter, FIG. 14 as well as the following discussion are intended to provide a general description of a suitable environment in which the various aspects of the disclosed subject matter can be implemented. One or more of the embodiments described herein and in connection with one or more of FIGS. 1-13 can be implemented in connection with the operating environment or portion thereof in connection with FIG. 14. For example, A computer-implemented method that comprises: sensing, using one or more sensors, ambient conditions associated with one or more conditions of a vehicle; determining, by a device operatively coupled to a processor, context of an occupant of the vehicle; analyzing, by the device, one or more ambient conditions and the context; and adjusting one or more environmental conditions of a passenger compartment of the vehicle based on the analyzing the one or more ambient conditions and the context can be implemented utilizing at least certain aspects and features of the operating environment illustrated and described in connection with FIG. 14.

FIG. 14 illustrates a block diagram of an example, non-limiting operating environment in which one or more embodiments described herein can be facilitated. Repetitive description of like elements employed in other embodiments described herein is omitted for sake of brevity. With reference to FIG. 14, a suitable operating environment 1401 for implementing various aspects of this disclosure can also include a computer 1412. The computer 1412 can also include a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414. The system bus 1418 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1416 can also include volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1420 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1412 can also include removable/non-removable, volatile/non-volatile computer storage media. FIG. 14 illustrates, for example, a disk storage 1424. Disk storage 1424 can also include, but is not limited to, devices like a magnetic disk drive, floppy disk drive, tape drive, Jaz drive, Zip drive, LS-100 drive, flash memory card, or memory stick. The disk storage 1424 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1424 to the system bus 1418, a removable or non-removable interface is typically used, such as interface 1426. FIG. 14 also depicts software that acts as an intermediary between users and the basic computer resources described in the suitable operating environment 1401. Such software can also include, for example, an operating system 1428. Operating system 1428, which can be stored on disk storage 1424, acts to control and allocate resources of the computer 1412. System applications 1430 take advantage of the management of resources by operating system 1428 through program modules 1432 and program data 1434, e.g., stored either in system memory 1416 or on disk storage 1424. It is to be appreciated that this disclosure can be implemented with various operating systems or combinations of operating systems. A user enters commands or information into the computer 1412 through input device (s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device (s) 1440 use some of the same type of ports as input device(s) 1436. Thus, for example, a USB port can be used to provide input to computer 1412, and to output information from computer 1412 to an output device 1440. Output adapter 1442 is provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a computer, a server, a router, a network PC, a workstation, a microprocessor based appliance, a peer device or other common network node and the like, and typically can also include many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1450 refers to the hardware/software employed to connect the network interface 1448 to the system bus 1418. While communication connection 1450 is shown for illustrative clarity inside computer 1412, it can also be external to computer 1412. The hardware/software for connection to the network interface 1448 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and number-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms (such as in the examples provided above). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination thereof for purposes of describing this disclosure, but one of ordinary skill in the art can recognize that many further combinations and permutations are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transition word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a memory storing one or more computer readable and executable instructions; and
   a processor operably coupled to the memory and that executes the computer readable and executable instructions, causing the processor to:
      train a comfort model corresponding to an occupant of a vehicle, by applying a machine learning approach to training samples, wherein a training sample includes:
         prior ambient conditions associated with the vehicle and prior body parameters associated with the occupant;
         a pre-adjustment status and a post-adjustment status of comfort facilities of the vehicle, corresponding to the prior ambient conditions and the prior body parameters; and
         a prior continuous comfort index based on a Euclidean distance between the pre-adjustment and post-adjustment statuses;
      sense, via a plurality of sensors, current ambient conditions associated with the vehicle and current body parameters associated with the occupant;
      determine a context of the occupant;
      infer, by the comfort model, a current continuous comfort index indicating a current comfort level of the occupant, based on the current ambient conditions, the current body parameters, and the context;
      determine one or more of the current ambient conditions to be adjusted to improve the current comfort level of the occupant, by:
         clustering, according to prior body parameters, the training samples that have a prior continuous comfort index better than the current continuous comfort index;
         identifying a cluster having prior body parameters closest to the current body parameters;
         calculating representative ambient conditions based on the prior ambient conditions of the identified cluster; and
         identifying, as the determined one or more of the current ambient conditions, one or more of the current ambient conditions that are worse, by a predetermined benchmark, than the representative ambient conditions; and
      adjust environmental conditions of a passenger compartment of the vehicle based on the determined one or more of the current ambient conditions.

2. The system of claim 1, wherein the plurality of sensors further sense information selected from the group consisting of body temperature of the occupant and an amount of clothing worn by the occupant.

3. The system of claim 1, wherein the context includes information selected from the group consisting of an action of the occupant, a destination for the occupant, and a trip length for the occupant.

4. The system of claim 1, wherein the comfort model determines an environmental condition for at least one of one or more occupants of the vehicle.

5. The system of claim 1, wherein the processor determines one or more comfort profiles for high frequency occupants of the vehicle.

6. The system of claim 1, wherein the processor identifies, via facial recognition, the occupant of the vehicle.

7. The system of claim 6, wherein the processor infers, via pattern recognition, occupant comfort from one or more facial expressions.

8. A system comprising:
a processor that executes computer-executable instructions stored on a computer-readable memory, wherein the computer-executable instructions cause the processor to:
train a comfort model corresponding to an occupant of a vehicle, by applying a machine learning approach to training samples, wherein a training sample includes:
prior ambient conditions associated with the vehicle and prior body parameters associated with the occupant;
a pre-adjustment status and a post-adjustment status of comfort facilities of the vehicle, corresponding to the prior ambient conditions and the prior body parameters; and
a prior continuous comfort index based on a Euclidean distance between the pre-adjustment and post-adjustment statuses;
sense, via one or more sensors, current ambient conditions associated with the vehicle and current body parameters associated with the occupant;
infer, by the comfort model, a current continuous comfort index indicating a current comfort level of the occupant, based on the current ambient conditions and the current body parameters;
determine one or more of the current ambient conditions to be adjusted to improve the current comfort level of the occupant, by:
clustering, according to prior body parameters, the training samples that have a prior continuous comfort index better than the current continuous comfort index;
identifying a cluster having prior body parameters closest to the current body parameters;
calculating representative ambient conditions based on the prior ambient conditions of the identified cluster; and
identifying, as the determined one or more of the current ambient conditions, one or more of the current ambient conditions that are worse, by a predetermined benchmark, than the representative ambient conditions; and
adjust one or more of the comfort facilities of the vehicle corresponding to the determined one or more of the current ambient conditions.

9. The system of claim 8, wherein the machine learning approach is a regression analysis.

10. The system of claim 8, wherein the current and prior ambient conditions include at least:

air temperature inside the vehicle;
noise volume inside the vehicle; and
light intensity inside the vehicle.

11. The system of claim 10, wherein the current and prior ambient conditions further include at least one from the group consisting of:
humidity inside the vehicle;
air quality inside the vehicle; and
pressure inside the vehicle.

12. The system of claim 8, wherein the current and prior body parameters include:
heart rate of the occupant; and
skin temperature of the occupant.

13. The system of claim 12, wherein the current and prior body parameters further include:
respiratory rate of the occupant;
skin humidity of the occupant; and
blood oxygen saturation of the occupant.

14. The system of claim 8, wherein the computer-executable instructions further cause the processor to infer a context of the occupant, including at least a recent activity of the occupant, and wherein the current continuous comfort index is based in part on the context.

15. An apparatus comprising:
a processor that executes computer-executable instructions stored on a computer-readable memory, wherein the computer-executable instructions cause the processor to:
train a comfort model corresponding to an occupant of a vehicle, by applying a machine learning approach to training samples, wherein a training sample includes:
past interior conditions associated with the vehicle and past biometric data associated with the occupant; and
a past continuous comfort index corresponding to the past interior conditions and the past biometric data, based on manual adjustments by the occupant to comfort facilities of the vehicle in response to the past interior conditions and the past biometric data;
sense, via one or more sensors, current interior conditions associated with the vehicle and current biometric data associated with the occupant;
infer, by the comfort model, a current continuous comfort index indicating a current comfort level of the occupant, based on the current interior conditions and the current biometric data;
determine one or more of the current interior conditions to be adjusted to improve the current comfort level of the occupant, by:
identifying a cluster of training samples having a past continuous comfort index better than the current continuous comfort index and having past biometric data closest to the current biometric data; and
identifying, as the determined one or more of the current interior conditions, one or more of the current interior conditions that are worse, by a predetermined benchmark, than representative interior conditions of the identified cluster; and
adjust one or more of the comfort facilities of the vehicle corresponding to the determined one or more of the current interior conditions.

16. The apparatus of claim 15, wherein the current and past interior conditions include at least:
air temperature inside the vehicle;

noise volume inside the vehicle; and light intensity inside the vehicle.

17. The apparatus of claim 16, wherein the current and past interior conditions further include at least one from the group consisting of:

humidity inside the vehicle;

air quality inside the vehicle; and pressure inside the vehicle.

18. The apparatus of claim 15, wherein the current and past biometric data include:

heart rate of the occupant; and skin temperature of the occupant.

19. The apparatus of claim 18, wherein the current and past biometric data further include:

respiratory rate of the occupant;

skin humidity of the occupant; and blood oxygen saturation of the occupant.

20. The apparatus of claim 15, wherein the computer-executable instructions further cause the processor to infer a context of the occupant, including at least a recent activity of the occupant, and wherein the current continuous comfort index is based in part on the context.

* * * * *